United States Patent
Klawitter et al.

(10) Patent No.: US 8,732,184 B2
(45) Date of Patent: *May 20, 2014

(54) METHOD AND APPARATUS FOR REMOTELY DISPLAYING A LIST BY DETERMINING A QUANTITY OF DATA TO SEND BASED ON THE LIST SIZE AND THE DISPLAY CONTROL SIZE

(75) Inventors: Paul T. Klawitter, Manteno, IL (US); Robert S. Gallagher, New Lenox, IL (US); David M. Johnson, Frankfort, IL (US)

(73) Assignee: Applied Systems, Inc., University Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/612,117

(22) Filed: Sep. 12, 2012

(65) Prior Publication Data

US 2013/0007030 A1    Jan. 3, 2013

Related U.S. Application Data

(63) Continuation of application No. 12/207,436, filed on Sep. 9, 2008, now Pat. No. 8,290,971.

(51) Int. Cl.
*G06F 17/30* (2006.01)
*G06F 7/00* (2006.01)

(52) U.S. Cl.
USPC ............................ 707/758; 707/755; 707/756

(58) Field of Classification Search
None
See application file for complete search history.

(56) References Cited

U.S. PATENT DOCUMENTS

| | | | |
|---|---|---|---|
| 6,157,935 A | 12/2000 | Tran | |
| 6,587,787 B1 * | 7/2003 | Yokota | ......................... 701/532 |
| 6,626,959 B1 | 9/2003 | Moise | |
| 6,636,242 B2 | 10/2003 | Bowman-Amuah | |
| 7,185,274 B1 | 2/2007 | Rubin | |
| 7,188,308 B2 | 3/2007 | Weise | |
| 7,251,776 B2 | 7/2007 | Handsaker | |

(Continued)

FOREIGN PATENT DOCUMENTS

| | | |
|---|---|---|
| GB | 2391668 | 2/2004 |
| WO | 2006036290 | 4/2006 |
| WO | 2007052285 | 5/2007 |

OTHER PUBLICATIONS

ListView. VirtualMode Property, Microsoft .NET Framework Class Library.

(Continued)

*Primary Examiner* — Kuen Lu
(74) *Attorney, Agent, or Firm* — K&L Gates LLP

(57) ABSTRACT

A system and method for remotely displaying a plurality of data items is disclosed. The system determines a total quantity of displayable data items and optionally receives an indication of a display control size from a remote client. The server stores a threshold value indicating a relationship between a quantity of data items and a size of a display control. The server compares the quantity of data items and the received indication of the display control size. If the comparison exceeds the threshold value, the server sends a subset of the items to the remote client for display, and sends additional items as requested by the remote client. If the comparison is less than the threshold value, the server sends each of the items to the remote client for display. The server repeats this comparison for changes in the quantity of data items or the size of the display control.

20 Claims, 8 Drawing Sheets

(56) References Cited

U.S. PATENT DOCUMENTS

| | | | |
|---|---|---|---|
| 7,274,389 B1* | 9/2007 | Hieda | 348/207.1 |
| 7,379,078 B1 | 5/2008 | Gossweiler, III | |
| 2004/0177323 A1 | 9/2004 | Kaasila | |
| 2004/0261025 A1 | 12/2004 | Rizk | |
| 2005/0094207 A1 | 5/2005 | Lo | |
| 2005/0140694 A1 | 6/2005 | Subramanian | |
| 2005/0216836 A1 | 9/2005 | Duke | |
| 2006/0095515 A1 | 5/2006 | Forstadius | |
| 2006/0271526 A1 | 11/2006 | Charnock | |
| 2007/0033531 A1* | 2/2007 | Marsh | 715/738 |
| 2007/0226635 A1* | 9/2007 | Goebel et al. | 715/745 |
| 2007/0288890 A1 | 12/2007 | Wells | |
| 2008/0046803 A1 | 2/2008 | Beauchamp | |
| 2008/0055305 A1 | 3/2008 | Blank | |
| 2008/0091466 A1 | 4/2008 | Butler | |
| 2008/0126092 A1* | 5/2008 | Kawazoe et al. | 704/246 |
| 2008/0301578 A1* | 12/2008 | Olson | 715/802 |
| 2009/0164602 A1* | 6/2009 | Kies et al. | 709/217 |

OTHER PUBLICATIONS

International Search Report issued Nov. 6, 2009, corresponding to Intl. Appln. No. PCT/US2009/056373.

* cited by examiner

FIG. 3
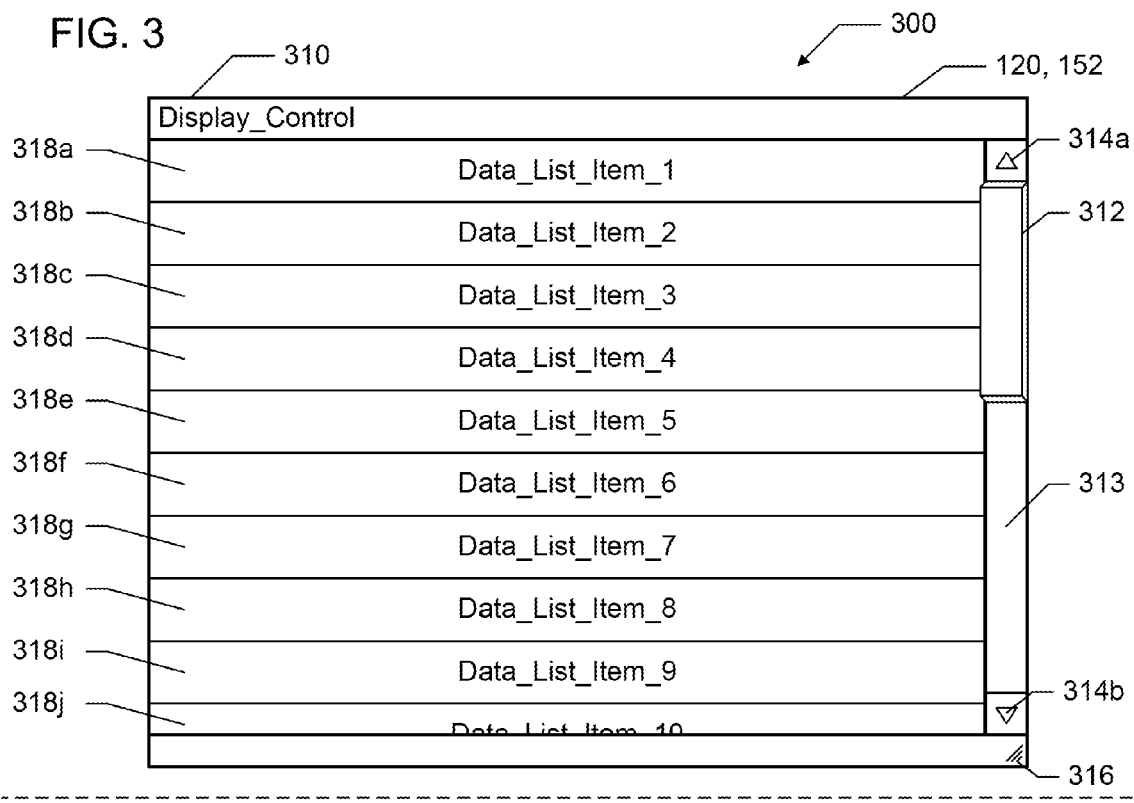
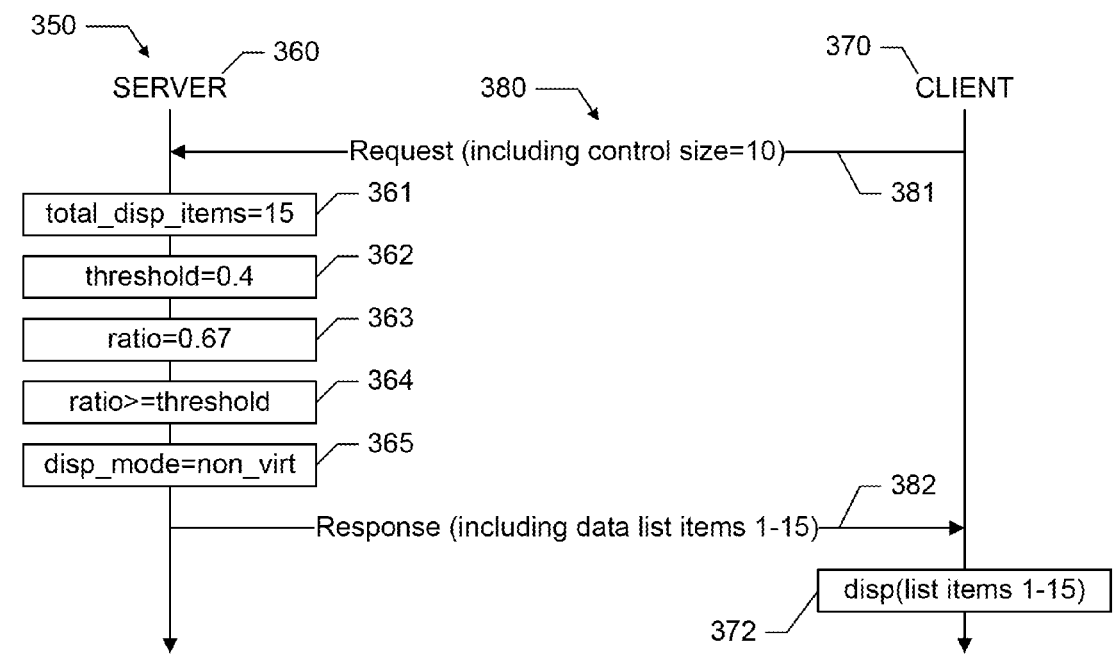

FIG. 4
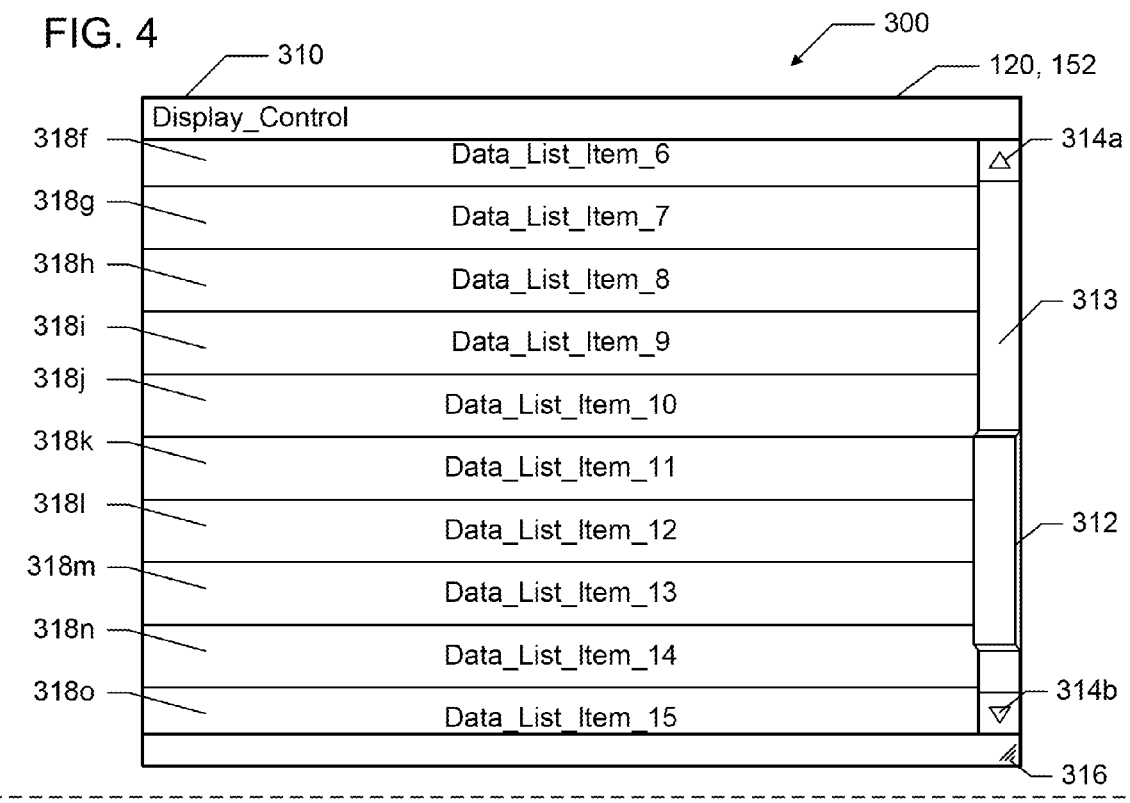
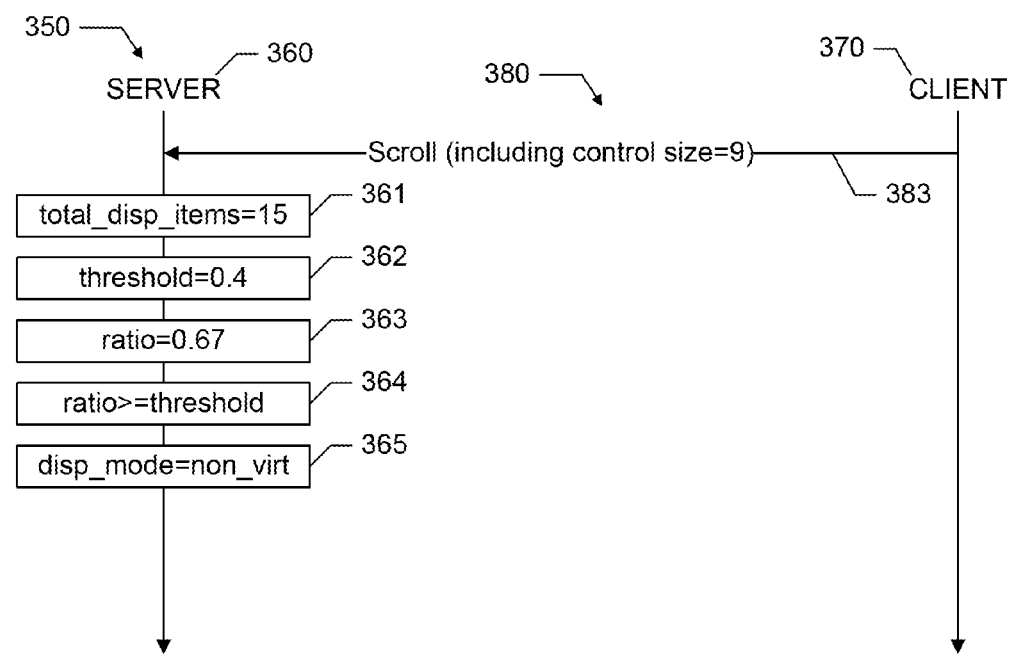

FIG. 5
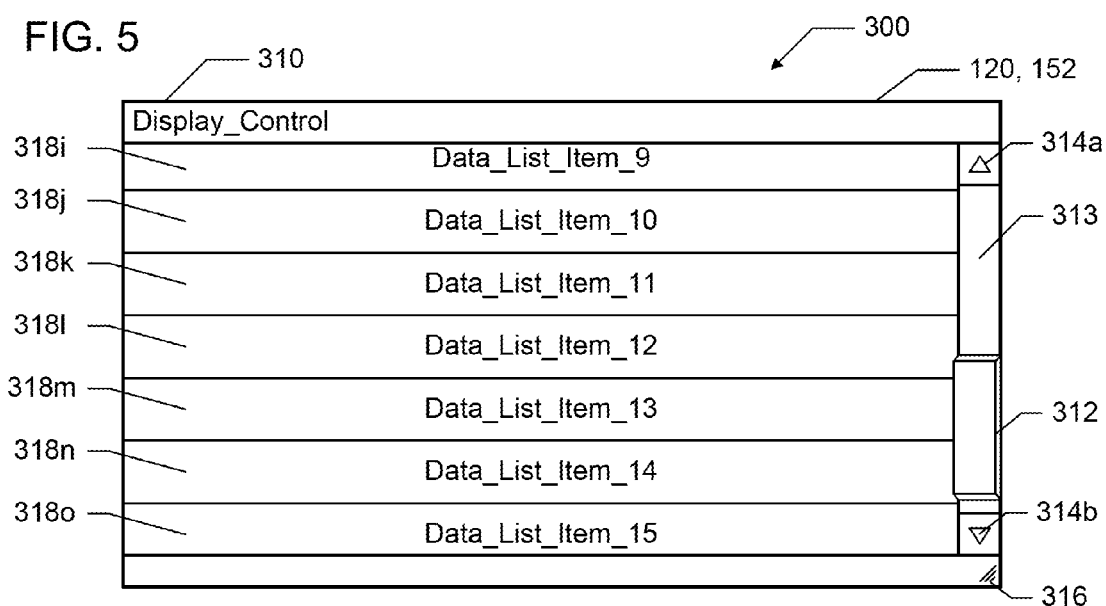
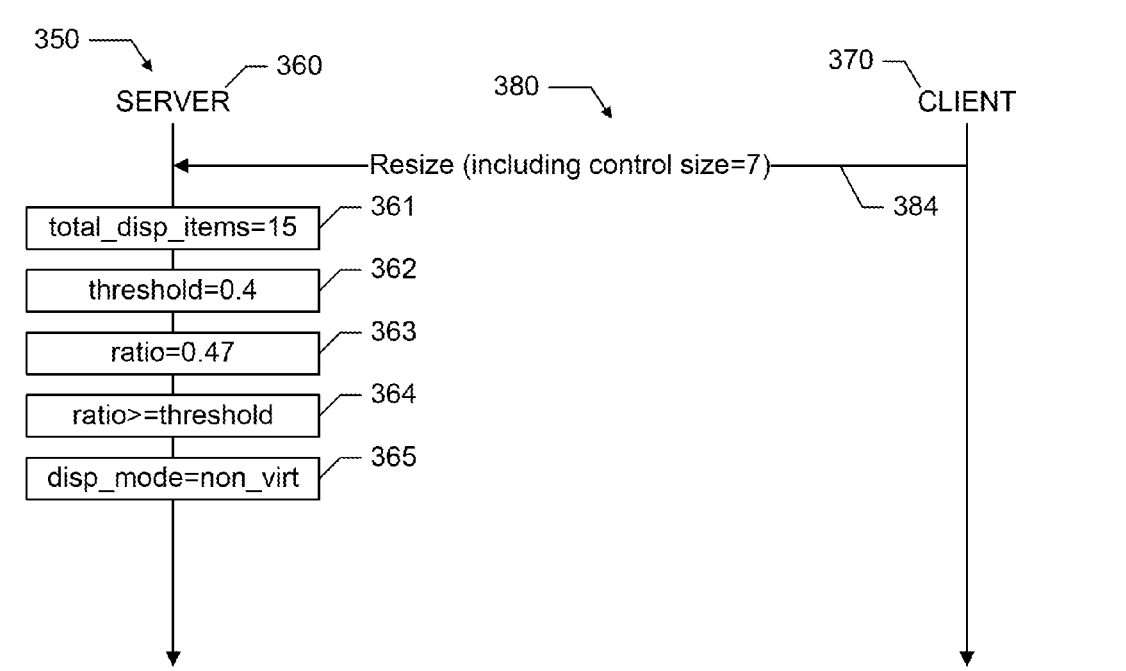

FIG. 6
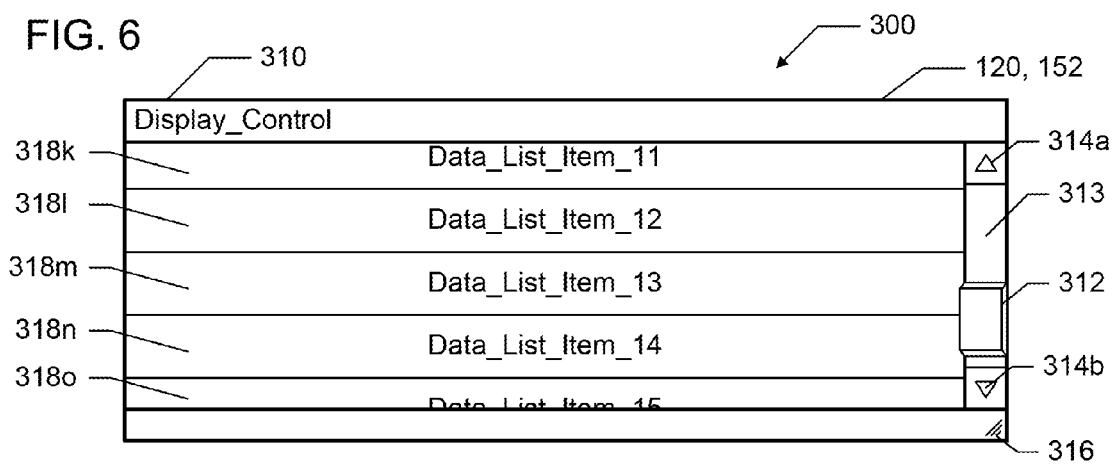
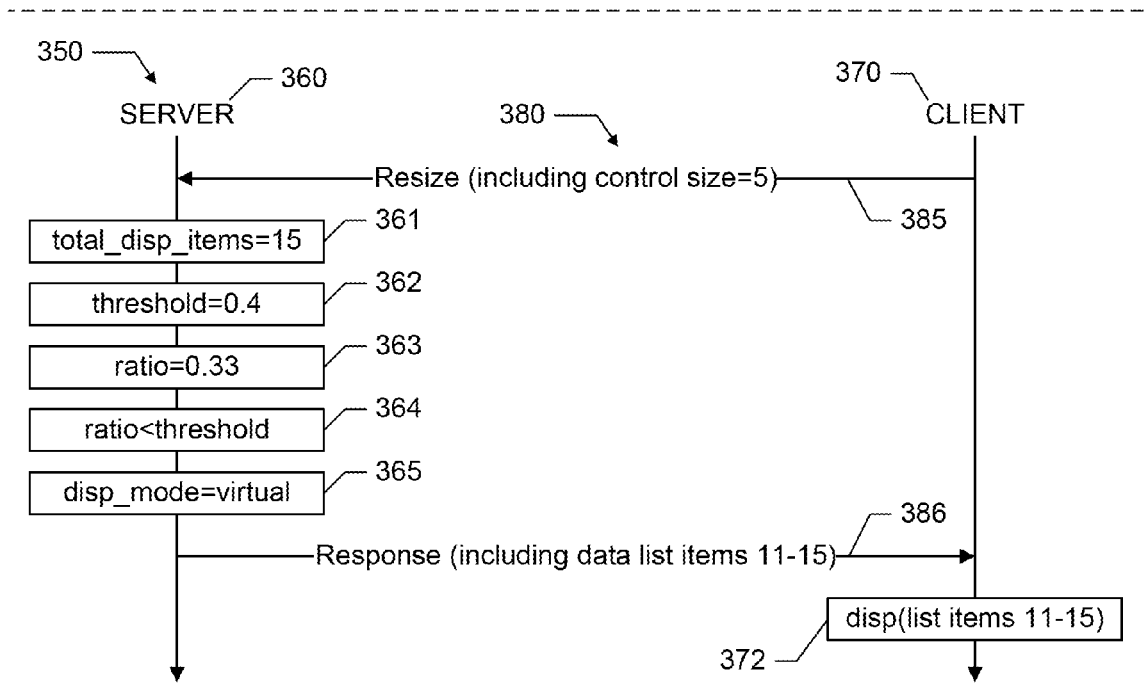

FIG. 7
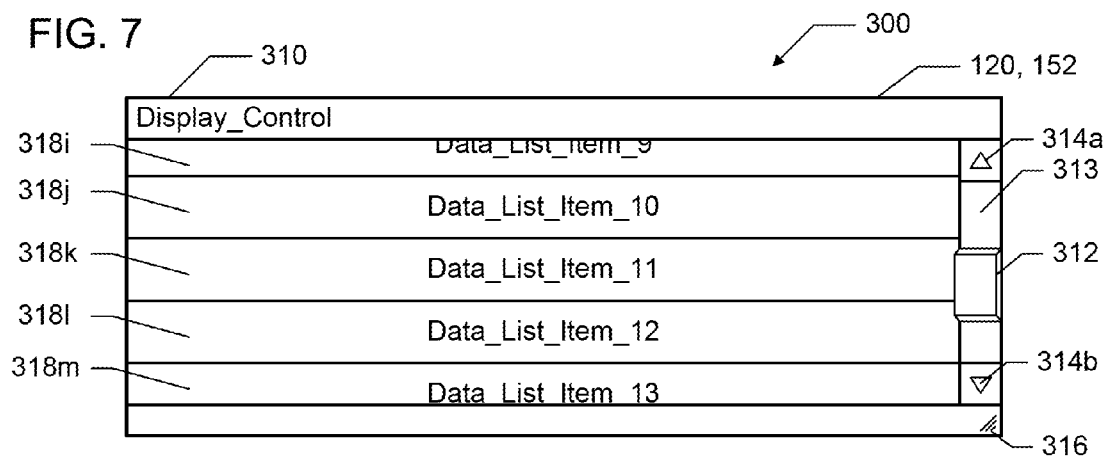
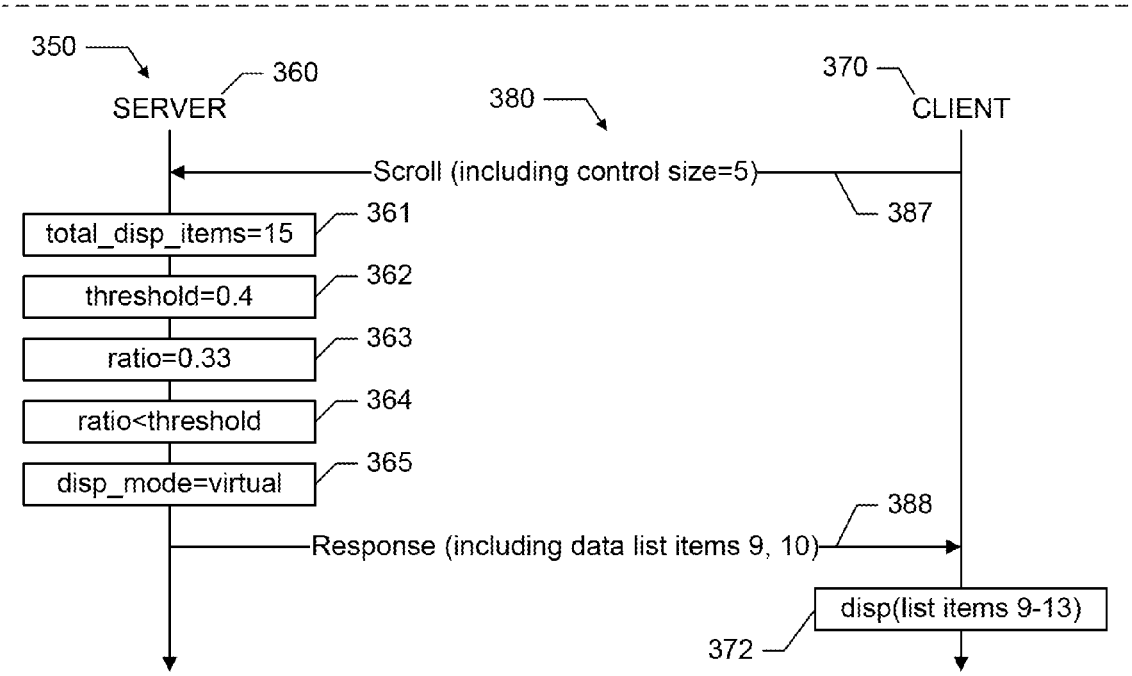

FIG. 8
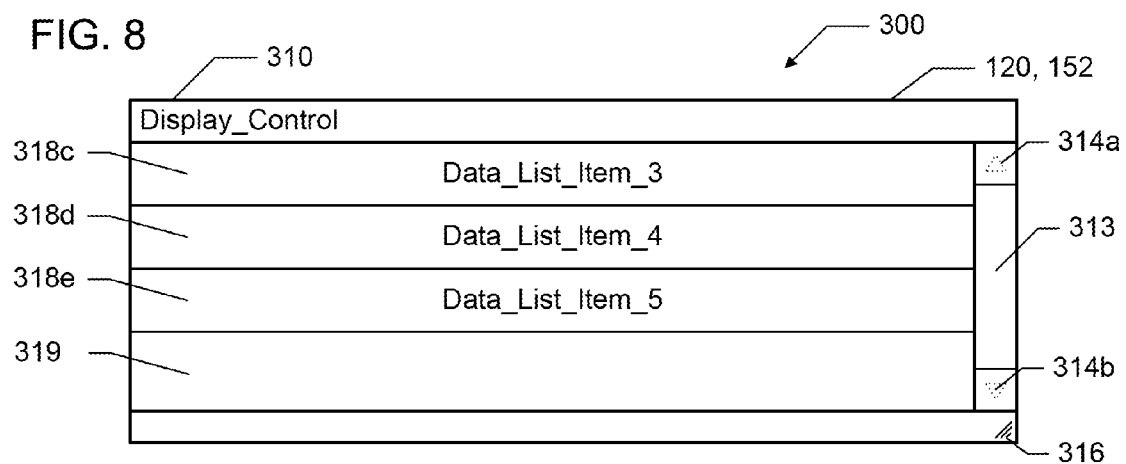
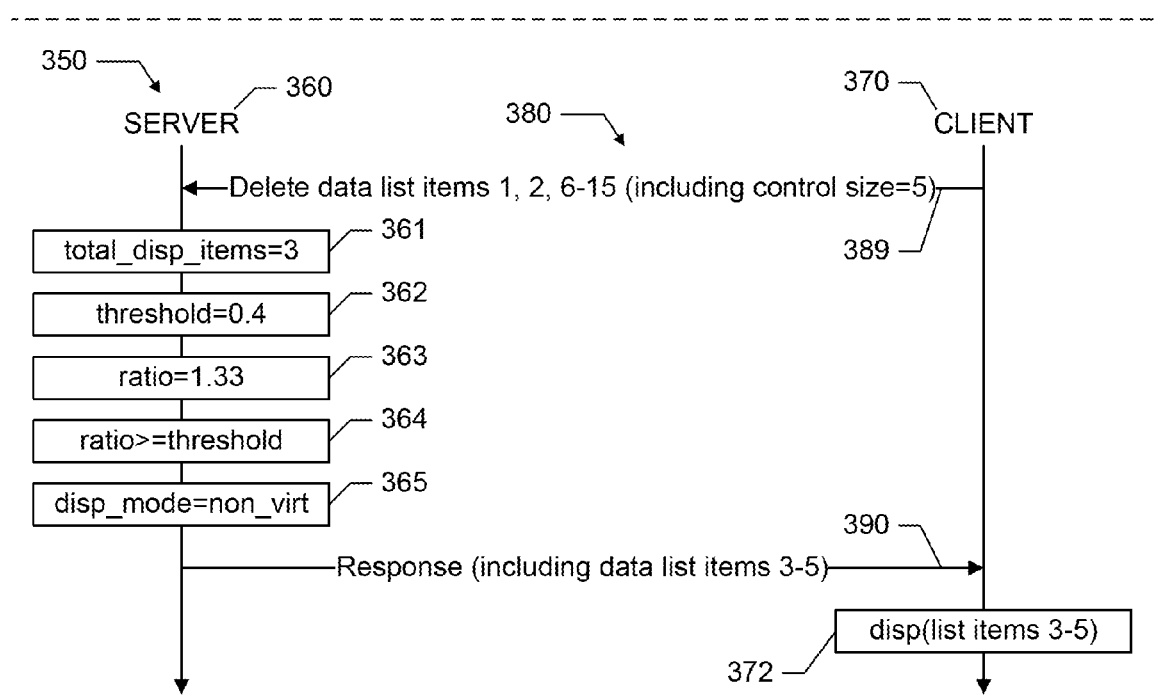

METHOD AND APPARATUS FOR REMOTELY DISPLAYING A LIST BY DETERMINING A QUANTITY OF DATA TO SEND BASED ON THE LIST SIZE AND THE DISPLAY CONTROL SIZE

PRIORITY CLAIM

This application is a continuation of and claims priority to U.S. application Ser. No. 12/207,436, filed on Sep. 9, 2008, the entire contents of which is incorporated by reference herein.

CROSS-REFERENCE TO RELATED APPLICATIONS

This application is related to the following co-pending commonly-owned patent applications: "METHOD AND APPARATUS FOR REMOTELY DISPLAYING SCREEN FILES AND EFFICIENTLY HANDLING REMOTE OPERATOR INPUT," application Ser. No. 12/207,448; "METHODS AND APPARATUS FOR DELIVERING DOCUMENTS," application Ser. No. 12/207,425; "METHOD, SYSTEM, AND APPARATUS FOR SCANNING AND IMPORTING DOCUMENTS," application Ser. No. 12/207,449; "METHOD AND APPARATUS FOR DISPLAYING A MENU FOR ACCESSING HIERARCHICAL CONTENT DATA INCLUDING CACHING MULTIPLE MENU STATES," application Ser. No. 12/207,442; and "METHOD, SYSTEM, AND APPARATUS FOR SECURE DATA EDITING," application Ser. No. 13/536,593; the entire contents of each of which is incorporated by reference herein. Also, this application is related to the issued patent "METHOD, SYSTEM, AND APPARATUS FOR SECURE DATA EDITING," issued as U.S. Pat. No. 8,234,219, the entire contents of which is incorporated by reference herein.

TECHNICAL FIELD

The present system relates in general to systems for displaying lists at remote locations, and more specially to an intelligent system for displaying list data on a remote display control by potentially sending only a subset of the list data to a remote client machine based on the quantity of list data to be displayed and the size of the display control at the remote client machine.

BACKGROUND

Software which displays lists of data enables an operator such as a database administrator or a database user to scroll through and selectively view vast amounts of data from a manageable interface such as a display control. Specifically, such software enables the operator to view a subset of the displayed data and to input one or more commands, such as a scroll up command or a scroll down command, to the display control, which cause the display control to display a different subset of the displayed data.

To indicate to the operator that such an input is appropriate, the display control may include a scroll bar, scroll arrow, or other suitable indicia. The operator may use an input device such as a mouse, a scroll-wheel, or a keyboard to input the command to scroll to a different subset of the data. Certain display controls may display such scrolling by displaying a new subset of the data items having substantially the same list items as the previously displayed (i.e., pre-scrolled) subset of the data, but with at least one item removed and at least one item added to the subset. In this way, certain display controls sequentially display a plurality of subsets of data to give the operator the impression that he or she is scrolling through a large list of data items.

Certain display controls also enable the operator to modify the size of the display control used to display a list of data items. For example, certain software may enable an operator to select a resize indicator of a list control and indicate a new size for the list control, thus enabling the operator to decide whether the list control should be sized to display 50 list items or 5 list items. This determination may be limited based on one or more physical limitations of the hardware executing the display control, such as monitor or display size and/or processor speed. So long as the operator is within the hardware constraints of the system, such display controls enable the operator to customize the control to simultaneously display a useful quantity of data. For example, the operator may determine that simultaneously viewing 50 data items is useful when a list includes thousands of data items, and may decide that simultaneously viewing only 5 data items is useful for a list having fewer than one hundred data items.

When such display software is implemented in a network environment, where bandwidth can be at a premium, it is desirable to enable an operator to control the amount of data sent over the networked connection. Thus, certain known software is configured to display a plurality of list data items in a remote display control by operating in either a virtual mode or a non-virtual mode.

Software that is configured to display list data in virtual mode using a remote display control sends only the subset of data needed to fill the display control at a given time. For example, such software may send 50 data items out of thousands of data items to a remote display control sized to display only 50 entries simultaneously. Such software, operating in virtual mode, sends additional data as it is needed, such as based on the operator scrolling through the list, deleting data items for the list, etc. For example, if the operator inputs an up-arrow keystroke, virtual mode software may send data representing the data item immediately above the previously top-positioned data item. It should be appreciated that software configured to operate in virtual mode as described, though minimizing initial bandwidth usage (i.e., only the displayable items are initially sent), requires constant or near-constant network connectivity (i.e., each changed in the displayed set of data requires a small amount of data to be sent).

Software configured to operate in non-virtual mode sends data representing each of the data items upon initialization or creation of the display control. For example, regardless of the size of the display control, if a list includes 200 data items, remote display software operating in non-virtual mode sends all 200 items to the display control. The display control stores the sent data, and internally determines which of the stored data items to display based on operator input. It should thus be appreciated that an operator can scroll through the data items without the display control receiving additional data over the network connection. It should be appreciated that such non-virtual software reduces the need for constant or near-constant network connectivity, but requires substantial initial data throughput to send the entire list of data items upon initialization of the display control.

The software described above requires a software developer to make a determination during coding of whether to implement the software in virtual or non-virtual mode. Thus, such software lacks the flexibility to enable a determination of network capabilities on a remote user by remote user basis. Moreover, such software lacks the ability to determine whether to operate in virtual mode or in non-virtual mode based on the hardware capabilities of the computer system running the display control. The need for the developer to determine whether the software is to operate in virtual mode or non-virtual mode at development time is particularly problematic in the insurance industry, wherein insurance professionals use hardware having vastly differing capabilities to simultaneously access a single remote server.

SUMMARY

The system disclosed herein overcomes the described deficiencies of the prior art by providing an intelligent system for remotely displaying a subset of a plurality of data items in a navigable list. The disclosed system displays such a list by determining a characteristic of a display control on a remote client machine, the characteristic being specific to that remote client machine. For example, the system may determine a display control dimension. The system also stores a threshold value for use in determining whether to display a subset of data items in either virtual mode (i.e., only the displayed items are sent for a given subset) or non-virtual mode (i.e., each data item is sent prior to displaying the subset). By comparing the total quantity of data items in the list of data items to the characteristic specific to the remote client machine, the system determines whether or not the threshold value is exceeded. If the threshold value is met or exceeded, the system may display the data items in virtual mode. If the threshold value is not exceeded, the system may display the data items in non-virtual mode. For any changes made to the size of the data display control on the client machine, the disclosed system recalculates the relationship discussed above and re-compares the relationship to the threshold value. Such re-comparison may result in a change from operating in virtual mode to non-virtual or vice versa. Moreover, a change in the data for display can result in a change from operating in non-virtual mode to operating in virtual mode. Thus, the disclosed system enables a real-time, dynamic determination of whether to operate in virtual mode or non-virtual mode based on the size of the display controls of a plurality of remote clients and the quantity of items for display.

Additional features and advantages are described herein, and will be apparent from the following Detailed Description and the figures.

BRIEF DESCRIPTION OF THE FIGURES

FIGS. 3 to 8 are combination screen shots of a display control of a remote client and message flow diagrams corresponding to the screen shots for determining how much of the list data to send to the remote client.

DETAILED DESCRIPTION

Figure 1:
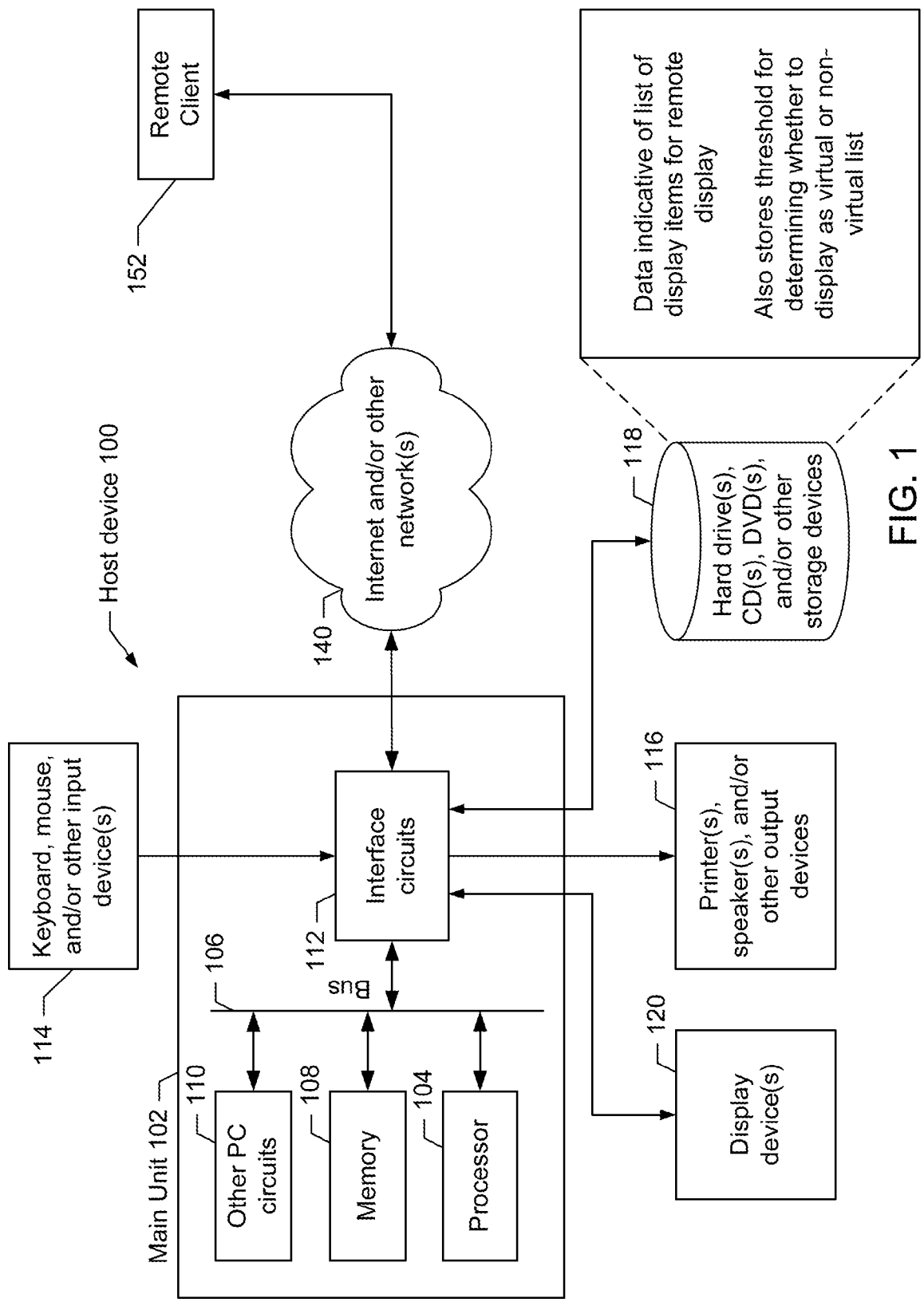
FIG. 1 is a block diagram of an example system architecture for implementing the intelligent list display system disclosed herein.

FIG. 1 is a block diagram of an example system architecture for implementing the intelligent list display system disclosed herein. Specifically, FIG. 1 illustrates a schematic block diagram of a host device (e.g., host device 100) for implementing the disclosed intelligent list display system. In the example architecture, the host device 100 includes a main unit 102 which preferably includes one or more processors 104 electrically coupled by an address/data bus 106 to one or more memory devices 108, other computer circuitry 110, and one or more interface circuits 112. The processor 104 may be any suitable processor. The memory 108 preferably includes a combination of volatile memory and non-volatile memory. Preferably, the memory 108 stores a software program that interacts with the other devices in the system as described below. This program may be executed by the processor 104 in any suitable manner. The memory 108 may also store digital data indicative of documents, files, programs, web pages, etc. retrieved from a remote client 152, such as modifications made remotely to a display control of a remote client 152, modifications made remotely to a plurality of list items displayed on the remote client 152, or inputs representing scrolling or other navigation of the plurality of list items using the remote client 152. In one example described in more detail below, a display control of the remote client 152 may display or show a subset of a plurality of list items in either virtual mode or non-virtual mode.

The interface circuit 112 may be implemented using any suitable interface standard, such as an Ethernet interface and/or a Universal Serial Bus (USB) interface. One or more input devices 114 may be connected to the interface circuit 112 for entering data and commands into the main unit 102. For example, the input device 114 may be a keyboard, mouse, touch screen, track pad, track ball, isopoint, and/or a voice recognition system.

One or more displays 120 or printers, speakers, and/or other output devices 116 may also be connected to the main unit 102 via the interface circuit 112. The display 120 may be a cathode ray tube (CRT), liquid crystal display (LCD), or any other type of display. The display 120 may generate visual displays of data generated during operation of the host device 100, such as those screen shots described below. For example, the display 120 may be used to display a display control including a plurality of list items, the display control operating in either virtual or non-virtual mode depending on a dimension of the display control. It should be appreciated that the display 120 may not be present in the disclosed intelligent system for displaying list data. Specifically, if the disclosed system is configured to display list data on remote clients such as remote client 152, a display 120 may not be needed.

One or more storage devices 118 may also be connected to the main unit 102 via the interface circuit 112. For example, a hard drive, a compact disc (CD) drive, a digital versatile disc (DVD) drive, a tape drive, and/or any other suitable storage device may be connected to the main unit 102. The storage devices 118 may store any type of data used by the host device 100 or sent to the remote client 152. In one example, described in more detail below, the storage device 118 stores information about a plurality of list data items for remotely displaying on the remote client 152. The information about the plurality of list data items may include the list data items themselves, and may also include content data associated with the display items. The storage device 118 may store a threshold value such as a static decimal value for determining whether to display the plurality of display items in virtual mode or in non-virtual mode, as discussed below.

The host device 100 may exchange data with the one or more remote clients 152 using a connection to network 140. The network connection may be any suitable network connection, such as an Ethernet connection, digital subscriber line (DSL), telephone line, coaxial cable, etc. Access to a host device 100 may be controlled by appropriate security software or security measures. An individual operator's access can be defined by the host device 100 and limited to certain data and/or actions. Accordingly, operators of the system may be required to register with one or more host devices 100. The data exchanged between the host device 100 and the remote client 152 may include screen files (i.e., image data for display at the remote client 152), trapped events at the remote client 152 (i.e., scroll events, resize events, add data events, delete data events, etc.), and raw data including data a plurality of data items and any content data associated with the data items.

It should be appreciated that other suitable architectures are contemplated by the disclosure herein. For example, architectures including a plurality of remote clients 152, or architectures wherein the host device 100 includes only a storage device 118 are contemplated. It should be appreciated that in these various contemplated architectures, some or most of any processing performed to determine whether to display list data items in virtual or non-virtual mode is performed by one or more of the remote clients 152.

Figure 2:
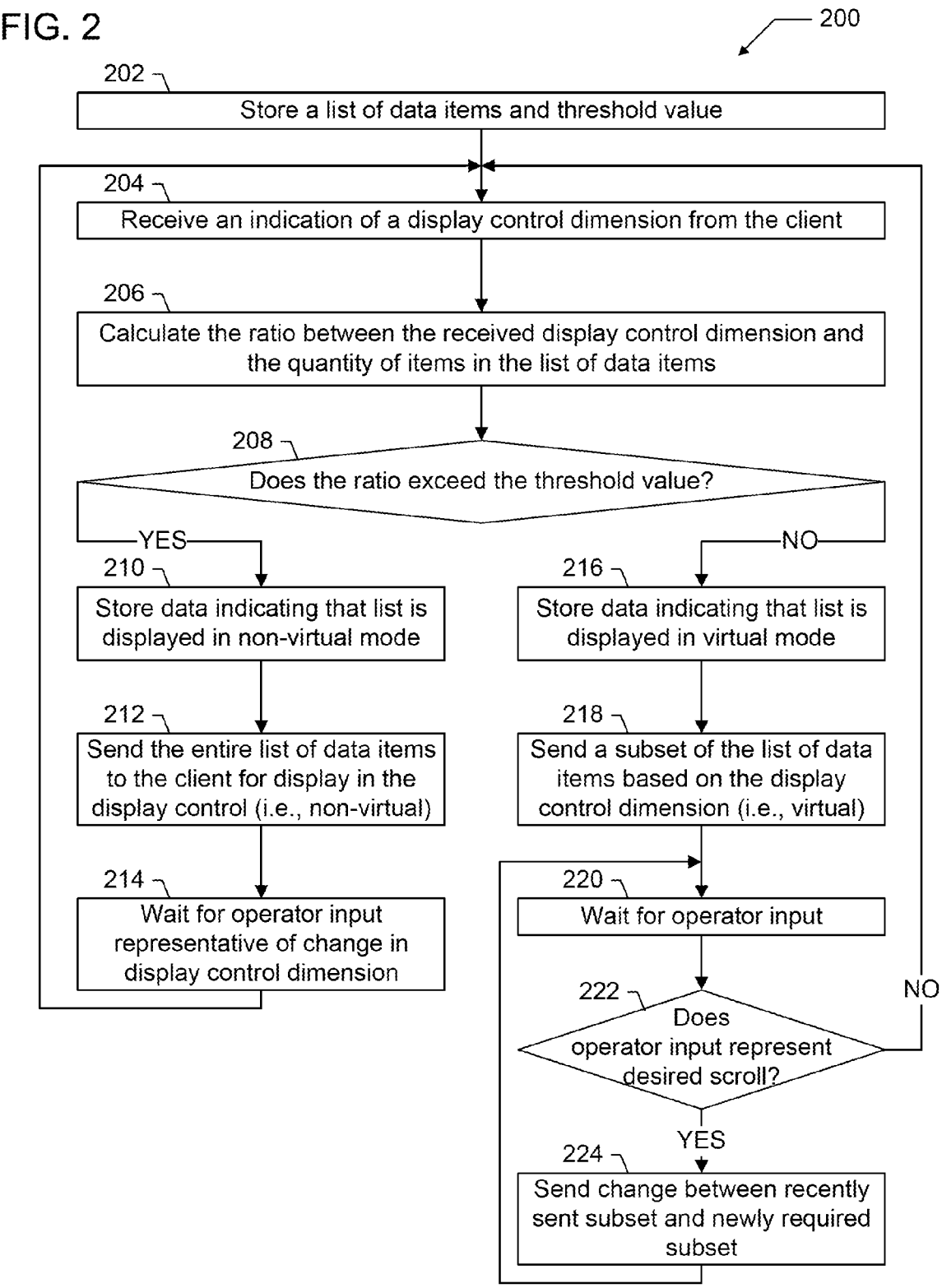
FIG. 2 is a flow chart of an example process for intelligently determining how much list data to send to a remote client based on the quantity of list data and also based on the size of the display control of the remote client.

FIG. 2 is a flow chart of an example process for intelligently determining whether to send list data to a remote client 152 in either virtual mode (i.e., sending a subset of the list data items) or non-virtual mode (i.e., sending all of the list data items) based on a quantity of list data items and also based on a dimension of a display control executed by the remote client 152. Although the example process 200 for intelligently determining whether to operate in virtual mode or to operate in non-virtual mode is described with reference to the flow chart illustrated in FIG. 2, it should be appreciated that many other methods of intelligently determining whether to operate in virtual or non-virtual mode are contemplated. For example, the order of certain of the blocks may be changed, and certain of the blocks described are optional.

The process 200 of FIG. 2 may be executed by an intelligent list display system such as a display system operating on host device 100. The host device 100 may be acting as a server of list data items. The host device 100 may serve these list data items to a remote client 152 for display using one or more display controls running thereon. It should be appreciated that the following description relates to the host device 100 serving such list data item information to the remote client 152, and the remote client 152 enabling an operator to input various desired operations to perform with respect to the plurality of list data items. It should be appreciated that many other hardware configurations are contemplated for executing process 200, such as hardware configurations wherein one or more of the decisions and/or actions indicated by process 200 are performed by the remote client 152.

The process 200 of FIG. 2 begins with the host device 100 storing a list of data items in the memory device 118 of the host device 100 (block 202). The list of data items may be stored based on user input at the input devices 114, user input at the remote client 152, or from another suitable memory device such as a CD-ROM. The list of data items may represent the displayable data for viewing by the operator at the remote client 152. The host device 100 also stores a threshold value (block 202). The threshold value may be hard-coded into software running on the host device 100, or may alternatively be entered by an operator using the one or more input devices 114 of the host device 100. Alternatively, the threshold value may be entered by an operator at remote client 152 using a suitable input device to indicate a desired threshold value. The threshold value may be a ratio comparing the size of a display control at a remote client 152 with the quantity of items in the list, and may be used, as described below, to determine whether to remotely display the list items in virtual mode or in non-virtual mode.

It should be appreciated that the storage of the list of data items and the threshold value may be performed without regard for the technical specifications of any remote client 152. That is, the storage of such data may be viewed as storing static data, without customization for a particular remote client 152, for determining whether to remotely display data in virtual mode or non-virtual mode.

The host device 100 may next receive an indication a dimension of a display control running on a remote client 152 (block 204). The dimension may include a quantity of pixels (i.e., 400 pixels), a list item display capacity (i.e., a maximum of 10 list items), or any other suitable dimension. It should be appreciated that the display control dimension reflects a quantity of list items which are simultaneously displayable using the display control of the remote client 152. It should be further appreciated that the dimension may vary from one remote client to another based on each display control running on each remote client 152. Specifically, if a first remote client 152 has a larger monitor or display device than a second remote client 152, the dimension of the display control for the first remote client may indicate a capability to simultaneously display more list items than the second remote client.

The list display system next calculates a ratio between the received display control dimension and the total quantity of items in the list of data items for display (block 206). The calculated ratio may represent a percentage of the total list data items which can be simultaneously displayed using the display control of the remote client 152. For example, the list display system may receive an indication from a first remote client 152 that the first remote client 152 is capable of simultaneously displaying 10 list data items using its display control. If the list of data items includes 100 total data items, the disclosed system may calculate a ratio of 10/100 or 0.1. This means that the display control of the remote client 152 is capable of displaying 10% of the total list of data items at any given time. For a second remote client 152 which is capable of simultaneously displaying 25 data items, it should be appreciated that the ratio for the second remote client 152 indicates that it can simultaneously display 25% of the total data items. It should thus be appreciated that by calculating a ratio (block 206), the disclosed system customizes the determination of whether to operate in virtual or non-virtual mode on a remote client by remote client basis. That is, for the same quantity of list data items, a first remote client may have a first associated ratio and a second remote client may have a different, second ratio based on the hardware profile and/or operator preferences of each client.

The host device 100 compares the calculated ratio for a particular remote client 152 with the stored threshold value, which is applicable for all remote clients 152 (block 208). The result of this comparison may indicate whether the host device 100 should serve the list data items to the remote client 152 in virtual or non-virtual mode. Specifically, if the ratio exceeds the threshold value (block 208), the host device 100 stores data indicating that the list data items are to be served to the remote client 152 for display in non-virtual mode (block 210). It should be appreciated that if the ratio represents a percentage of the total list items which can be simultaneously displayed for a given remote client 152, the disclosed system displays the list items in non-virtual mode when a relatively high percentage of the list items can be simultaneously displayed (i.e., the display control is relatively large). On the other hand, if the ratio does not exceed the threshold value (block 208), the list display system stores data indicating that the list is to be displayed in virtual mode (block 216). It should be appreciated that the system displays the list items in virtual mode when a relatively small percentage of the list items can be simultaneously displayed (i.e., the display control is relatively small).

If the list display system stores an indication that the list is to be displayed in non-virtual mode for a given remote client 152 (block 210), the host device 100 sends the entire list of data items to the remote client 152 for display by the display control (block 212). If the display control of the remote client 152 is not sized to enable each of the data items to be simultaneously displayed, the display control of the remote client 152 determines how to display a subset of the data items. For example, the remote client 152 may determine that the display control should include a scroll bar and a plurality of arrow buttons to enable an operator to scroll upward and/or downward through the data items. Further, the remote client 152 may ensure that the appropriate display items are displayed as the operator scrolls through the list, and may enable the operator to manipulate the contents of the list such as by adding or deleting list data items. It should be appreciated that in non-virtual mode, as described, the host device may not need to send and/or receive data items over the network 140 after sending the initial set of data items. Rather, the remote client 152 locally stores each of the data items and locally handles any manipulation and display of those items.

The disclosed list display system intelligently determines how to display a plurality of list items by continually analyzing whether to operate in virtual mode or in non-virtual mode. Specifically, even if the system is operating in non-virtual mode, the host device 100 is configured to receive an input from an operator representative of a change in the display control dimension (block 214). For example, the disclosed remote client 152 may include a handler for trapping and sending a display control window resize event indicating a new display control window size to the host device 100. Such an indication includes a display control dimension received from the client (block 204). For any received display control window resize events, the host device 100 re-calculates the ratio between the current display control dimension and the quantity of items in the list of data items (block 206). Based on this newly calculated ratio (i.e., the ratio reflecting the new size of the display control), the disclosed system determines whether to continue displaying the plurality of list items in non-virtual mode or to begin displaying the plurality of list items in virtual mode. This determination is made, as discussed above, based on whether the re-calculated ratio exceeds the threshold value (block 208).

If the disclosed list display system determines that the ratio between the received display control dimension and the quantity of items in the list of data items does not exceed the threshold value (block 208), the system stores data indicating that the list is to be displayed at the remote client 152 in virtual mode (block 216). To display the list in virtual mode, the host device 100 sends a subset of the list of data items to the remote client 152, with the quantity of items in the subset being determined based on the display control dimension (block 218). That is, the system sends a subset of items containing only a quantity of items which can be simultaneously displayed in the display control of the remote client 252.

Upon sending the appropriate subset of list data, the host device 100 waits for an appropriate operator input to be trapped by the remote client 152 and sent to the host device 100 (block 220).

It should be appreciated that for simplicity, only two types of operator input are possible in the illustrated embodiment. First, the illustrated embodiment of the process 200 is capable of handling operator input representing a desire to scroll through the data to view at least one list data item not currently displayed by the display control. Second, the illustrated embodiment of the process 200 is capable of handling operator input representing a resizing of the display control of the remote client 152. It should be appreciated that various other types of input are possible in other, un-illustrated embodiments, such as inputs indicating a desire to add, delete, or otherwise modify the list data, inputs indicating a desire to view content data associated with the list data, or inputs indicating a desire to reorganize the displayed list data within the display control.

If the input received from the operator represents a desired scroll of the data items displayed in the display control (block 222), the disclosed system determines, based on the input, which new data items will be displayed after scrolling and sends any appropriate new data items to be displayed to the remote client 152 (block 224). The remote client 152 may delete or otherwise fail to store any of the data items which are no longer visible after scrolling. Thus, the remote client 152 may retain in its memory only the list data items being currently stored.

After sending the needed data to enable the remote client 152 to appropriately display the appropriate new subset of data items (block 224), the disclosed system again waits for operator input (i.e., either a scroll input or a resize input) (block 220).

If, while the host device 100 is awaiting operator input, the operator makes an input that does not indicate a desired scroll (i.e., in the two-input illustration of FIG. 2, the input indicates a change in size or dimension of the display control) (block 222), the disclosed system receives an indication of the display control dimension after the change in size (block 204). Using this newly-received dimension of the display control, the host device 100 recalculates the ratio between the display control dimension and the quantity of items in the list of data items (block 206). The host device 100 then determines whether the newly-calculated ratio exceeds the threshold value (block 208). If so, the host device 100 updates the data indicating the mode for sending list items to indicate non-virtual mode (block 210). If the newly-calculated ratio does not exceed the threshold value (block 208), the disclosed system updates the stored data to reflect sending in virtual mode.

As discussed above, the disclosed system may calculate the size of list data to be displayed by determining a quantity of list items to be displayed. Alternatively, the disclosed system may calculate the size of the list data, for purposes of calculating a relationship such as a ratio between the list data and the display control, by analyzing a size of the data items in bytes. Thus, one hundred list items may cause the system to operate in virtual mode if the total size of the list items exceeds fifty kilobytes, but one hundred list items may cause the system to operate in non-virtual mode if the total size of the list items does not exceed fifty kilobytes. Similarly, the calculation of the size of the list items may be based on a number of characters in the list items, a size of content data associated with the list items, or any other suitable indicator of a size of the list data.

It should be appreciated that based on the resized display control, the disclosed system may determine that a change from displaying the list items in virtual mode to non-virtual mode is appropriate (i.e., if the size of the display control is increased such that the ratio is increased to above the threshold value). Thus, the disclosed intelligent data item display system is configured to continually switch between virtual and non-virtual modes in real-time based on appropriate operator inputs. The disclosed system is also configured to send necessary data, when operating in virtual mode, to enable an operator to scroll through the plurality of list data items despite only a subset of the items being stored on the remote client 152 at any given time.

The disclosed system may be configured to change from operating in non-virtual mode to operating in virtual mode only if the data to be displayed changes. That is, a change in the data to be displayed, if coupled with an appropriate change in size of the display control, may represent the only set of conditions for which the system switches from operating in non-virtual mode to operating in virtual mode. Further, the disclosed system may be configured to change from operating in non-virtual mode to operating in virtual mode only if the data to be displayed is modified to include additional data. That is, even a reduction in the data to be displayed, coupled with an appropriate change in size of the display control, lowers the ratio between the size of the display control to a quantity below the threshold, the disclosed system may not switch from operating in non-virtual mode to operating in virtual mode. Rather, the only time such a switch may be made is if additional data to be displayed is added.

It should be appreciated that by displaying a list at a remote client 152 in non-virtual mode, the disclosed system minimizes ongoing or continuous use of network resources because data only needs to be sent a single time. It should also be appreciated, however, that the single time sending of data may represent a significant use of bandwidth, as the disclosed system initially sends the entire set of list data. It should also be appreciated that a continuing network connection may be necessary, as the disclosed system may continuously detect changes in the dimensions of the display control of the remote client 152 and update the determination whether to act in virtual or non-virtual mode based on the changes in dimension.

It should be further appreciated that by displaying a list at a remote client 152 in virtual mode, the disclosed system minimizes the initial use of bandwidth but increases the ongoing or continuous need for bandwidth, as browsing or scrolling through the list of data items requires additional data items to be sent to the remote client 152.

The disclosed system for displaying a list of data items may also enable an operator at a remote client 152 to modify the quantity of data items stored in the storage device 118. For example, the disclosed system may enable the operator to add and/or delete data items from the list of data items. If a system according to the instant disclosure enables this functionality, the host device 100 may receive a message indicating the operator's desire to add or delete a data item and may make the appropriate addition or deletion in the storage device 118. Moreover, since the total quantity of data items in the list of items may be altered based on such additions and/or deletions, the disclosed system may recalculate the ratio between the received display control dimension and the quantity of items in the list of data items even if the display control dimension has not changed.

Depending on the functionality of the system, the host device 100 may update the ratio which is compared to the threshold value based on the occurrence of any event which modifies at least one of the quantities used to calculate the ratio. Thus, modification of any of the quantities of the ratio may result in a change from displaying the list items in virtual mode to displaying the list of items in non-virtual mode or vice versa.

One or more of the data items in the list of data items may be associated with content data. The system may thus enable an operator to select one or more of the list items using an input device connected to the remote client 152, and may send the content data associated with the list device for viewing on the remote client 152. The system may send this data only in response to an operator selecting such a list item, regardless of whether the system is operating in virtual mode or in non-virtual mode. Alternatively, the system may send the content data associated with any list items which are sent according to the process 200. For example, if the system is operating in non-virtual mode, the system may initially send all the list items and all the associated content data. If the system is operating in virtual mode, the system may send only the content data associated with the send list items, such that as an operator browses through the list items, the content data stored locally on the remote client 152 is updated appropriately.

Alternatively, the disclosed system may send only the content data associated with the displayed list items regardless of whether the system is sending list items in virtual mode or non-virtual mode. Thus, the system may determine that it is operating in non-virtual mode and may send each of the list data items to the remote client 152. Regardless of its operation in non-virtual mode, the system may send only the content data associated with the list data items currently displayed by the display control. Thus, the disclosed system may be viewed as determining which list items to display in either virtual or non-virtual mode, and may be further viewed as sending the content data associated with the displayed list items in only non-virtual mode.

The threshold value stored by the disclosed system may be selected only once, such as being hard-coded in the software running on the host device 100. The threshold value may represent a programmer's perception of an appropriate percentage of the total number of list items that can be simultaneously displayed wherein utilizing the extra bandwidth initially required to operate in non-virtual mode is justified. Alternatively, the threshold value may be customized to one or more of a plurality of remote clients 152 in communication with the host device 100. For example, a threshold value may be dependent upon a hardware configuration of a remote client 152, such as a quantity of memory, a processor speed, or a size of a display device such as a monitor. The operator at the remote client 152 may select an appropriate threshold value based on the network connection and/or hardware capabilities of the remote client 152 used to access the remote list data display system.

The threshold value may reflect additional factors than simply a relationship between a quantity of list items and a dimension of a display control. For example, the threshold value may reflect the hardware and/or network capabilities of a remote client 152 such that a hard-coded threshold value is usable to customize the virtual/non-virtual determination made based on the hardware capabilities of an individual remote client. For example, a threshold value may be selected by multiplying, dividing, adding, or subtracting a quantity of list items, a dimension of a display control, a network connection speed, or a hardware capability indicator of the remote client 152. It should be appreciated that if the threshold value reflects such additional factors, the calculation of the ratio for comparison to the threshold value should also reflect the additional factors.

For example, a threshold value of 0.75 may be selected by a programmer or system operator. This value may be arrived at by multiplying a ratio of ½ (representing the ratio of the dimension of the display control to the quantity of list items) by a factor of 1.5. When determining the ratio for a remote client 152, the disclosed system may divide the size of the display control by the quantity of list items and multiply the result by 1.0 if the connection is a dial-up or other relatively slow connection and by 2.0 if the connection is a broadband or other relatively fast connection. Thus, even if a ratio of the size of the display control to the quantity of list items is relatively smaller than ½ (i.e., a ratio of ⅖), the disclosed system may still elect to operate in non-virtual mode (i.e., it may initially send data representing each of the list items) if the remote client 152 is connected to the host device 100 via a broadband connection (i.e., a ratio of ⅖ multiplied by a connection factor of 2.0 results in a factor of 0.8, which exceeds the threshold value of 0.75 and therefore indicates that the disclosed system should operate in non-virtual mode). It should be appreciated that any other appropriate factors may be built into the calculation of the threshold value and ratios, such as operator preference, hardware capability, network access cost, network access speed, usage pattern, and/or any other suitable factor.

FIG. 2 refers to calculation of a ratio between the received display control dimension and the quantity of items to be displayed. It should be appreciated that the system disclosed herein is not limited to the calculation of such a relationship as a ratio. Rather, the disclosed system may use any quantifiable representation of a relationship between the capacity of the display control and the quantity of data to display to determine whether to operate in virtual mode or in non-virtual mode. For example, the disclosed system may use a product of two numerals, or may use a more complex mathematical formula to quantify the noted relationship.

It should be further contemplated that the disclosed system is not limited to quantifying a relationship solely between the size of the display control and the amount of data to be displayed in order to determine whether to operate in virtual mode or in non-virtual mode. As noted above, the disclosed system may use additional factors, such as network speed, hardware capability, or operator preference to generate a quantity indicative of whether the system should operate in virtual mode or in non-virtual mode. Moreover, this determination need not be based at all on either size of the display control or the quantity of data to be displayed. For example, the determination in may be based solely on network speed, may be based solely on the absolute size of the display control, or may be based on some other appropriate factor. It should be appreciated that the disclosed intelligent system automatically determines whether to operate in virtual or non-virtual mode based on some potentially changing, quantifiable characteristic of either the remote client 152, the host machine 100, or the network 140.

The disclosed system may determine whether to operate in virtual mode or in non-virtual mode based on a size of a display control which is fixed—that is, the host device 100 may determine whether to send all of the data items or a subset of the data items by calculating a ratio based on a fixed-size display control. For example, if the disclosed system provides a display control at the remote client 152 which is a fixed size, such as 10 list data items, the disclosed system may calculate a ratio based on the relationship between the fixed size and the potentially variable quantity of data items to display. It should be appreciated that the remote client 152 may not need to repeatedly send data indicating the size of the display control, and may send such data only once or not at all. Thus, the disclosed system provides a dynamic system for displaying menu items where the decision to operate in virtual or non-virtual mode is made in real time based on a ratio between a potentially changing total quantity of items to display and a fixed display control size.

The disclosed system may be configured to receive data from the remote client 152 indicating the occurrence of various events at the remote client 152. For example, the disclosed system may be configured to receive not only data indicative of an operator scroll or display control resize input, but may also receive data indicative of additions of list items, deletions of list items, updates of list items, reordering of list items, filtering of list items, duplication of list items, updates of content data associated with list items, page-ups, page-downs, scrolls to the beginning or end of the list, jumps to particular list items (i.e., based on an alphabetical list of items), sort requests, and any other suitable input which could be handled by a suitable handler. In various embodiments, the disclosed system analyzes one or more of these inputs and modifies the calculated ratio or relationship based on these inputs to determine whether to continue operating in virtual or non-virtual mode or to change the operating mode.

The remote client 152 may store data previously sent by the host device 100 regardless of the mode in which the host device 100 is operating. For example, if the host device 100 is operating in virtual mode, the host device 152 may store data indicating a first 5 list items of 100 total list items. The host device 100 may determine (or store data indicating) which list items have been previously stored or cached on the remote client 152. Based on the determined list items, the host device 100 may not re-send certain items. In the example above, if an operator provides a scroll to bottom input, the host device 100 may send data representing the last 5 list items of the 100 total list items. If the operator subsequently enters a scroll to top input, the disclosed system may determine that the first 5 items have been previously stored or cached on the remote client 152, and may therefore not resend the first 5 items. Rather, the host device 100 may rely on the remote client 152 to display the cached first 5 items of 100 total items. The host device 100 may compare the displayed items to the items stored in the storage device 118 to determine whether the list items have been modified. The host device 100 may send the current list items stored in the storage device 118 only if the corresponding cached list items have been modified.

The disclosed system may be implemented substantially using software installed on the remote client 152. For example, the remote client 152 may store a threshold value and may store data about the list of items of the storage device 118, such as the quantity of list items. The remote client 152 may determine the size of the display control and may appropriately calculate the ratio between the display control dimension and the quantity of items in the list of data items. Based on the comparison of this ratio with the threshold value, the remote client 152 may determine whether to operate in virtual mode or non-virtual mode. According to the determination made by the remote client 152, the remote client 152 may request the required data from the host device 100. For example, if the remote client 152 determines that it is operating in virtual mode, the remote client 152 may request only the data required to fill the display control as determined by the remote client 152. If the remote client 152 determines that it is operating in non-virtual mode, the remote client 152 may request data representing all of the list items from the host device 100. The remote client 152 may be configured to enable an operator to modify the quantity of list items stored in the remote storage device 118. The host device 100 may send data indicating a current quantity of list items stored in the storage device 118 each time any operator at any host device 152 modifies the quantity of list items. It should be appreciated that the host device 100 may thus be responsible for ensuring that the remote clients 152 are aware of the current content of the storage device 118.

It should be appreciated that by offloading certain processing tasks from the host device 100, the disclosed system may rely more heavily on the processing capabilities of the remote client 152 and may require less processing capability from the host device 100. Moreover, it should be appreciated that offloading such processing tasks may result in simpler handling of operator input events, as data indicating each event may not need to be sent via the network 140 for handling by the host device 100, as in the process 200 described above with reference to FIG. 2.

In contrast to networked implementations such as the implementations described above, the disclosed system may also be implemented on a single computer or set of processing hardware. For example, in a system wherein processing resources are relatively scarce (i.e., a system with a relatively small amount of Random Access Memory (RAM)), the process 200 may be followed to determine whether to load an entire set of list items or a subset of the list items into relatively faster and relatively more scarce RAM from a more permanent (and slower) storage device such as a hard disk, a tape drive, or an optical drive. In such a system, the relatively small amount of RAM may necessitate care in determining what data to load on the RAM. It should be appreciated that loading data into RAM may enable faster access by the processor, such that one goal of a memory management sub-system of a computing system is to store the most frequently accessed data in the system's RAM. That is, the memory management sub-system may attempt to maximize the computing resources of system by providing relatively fast access to frequently used data and by providing relatively slower access to less-frequently used data.

Operation of a system in virtual mode may be achieved by loading only a subset of data from a relatively slow storage medium (i.e., a hard disk) into the relatively scarce, relatively faster storage medium (i.e., RAM) prior to display. This enables display while requiring a minimum amount of the relatively scarce, relatively faster storage medium. However, it should be appreciated that for the system to display data not included in the subset of the data, an additional transfer of the new data is necessary. Alternatively, operation of a system in non-virtual mode may be achieved by loading the full set of data to be displayed into the relatively faster storage medium. This may enable display of the full set of data without requiring additional data transfer from the hard disk to the RAM. Though operation in non-virtual mode provides faster access to the data, it should be appreciated that such non-virtual operation may consume a relatively higher amount of the relatively scarce faster memory resources (i.e., RAM).

As discussed above with respect to process 200, the system may make the determination whether to operate in virtual mode or non-virtual mode (i.e., whether to store all of the data or only a subset of the data on in RAM) based on a ratio between a size of a display control provided by the processor and a total size of the data items on the slower storage medium. It should be appreciated that a higher ratio indicates that more of the data items will be simultaneously displayed by the display control, and thus may indicate that it is more advantageous for the system to operate in non-virtual mode by making a single transfer of all the list data items to the RAM.

FIGS. 3 to 9 each illustrate a screen shot of a display control of a remote client 152 and a message flow diagram corresponding to the screen shot which illustrates the determination of whether to operate in virtual or non-virtual mode. FIGS. 3 to 9 each include a screen shot section 300 and a message flow diagram section 350. In the embodiments illustrated by FIGS. 3 to 9, the remote client 152 is a thin client—that is, most of the processing, including the determination whether to operate in virtual or non-virtual mode, is made by the host device 100 and the appropriate data for display is sent from the host device 100 to the remote client 152 for display. It should be appreciated that for FIGS. 3 to 9, the server 360 illustrated in the message flow diagram section 350 corresponds to the host device 100, and the client 370 corresponds to the remote client 152. Alternatively the server 360 and the client 370 may represent software modules disposed across a plurality of physical devices.

Screen shot sections 300 of FIGS. 3 to 9 include a display control 310 as displayed by the remote client 152. The display control 310 is entitled Display_Control and is labeled accordingly. It should be appreciated that in various embodiments, the display control 310 may be displayed on the display device 120 of host device 100, enabling an operator at the host device 100 to view a plurality of data list items stored on the storage device 118 of the host device 100.

The display control 310 of FIGS. 3 to 9 includes various indicators which enable an operator to input desired scrolling of the displayed data. For example, the display control 310 includes a slider 312 which enables an operator to scroll upward and/or downward through the list of data list items. The slider 312 is positioned in a slider bar 313 which indicates a relative position of the slider with respect to the list of data items and which indicates an amount by which the list can be scrolled. The display control 310 also includes arrow buttons 314a and 314b which enable the operator to scroll through the list items. For example, by selecting arrow buttons 314a or 314b, the operator can cause the slider 312 to slowly move within the slider bar 313, and can simultaneously cause the displayed data list items to scroll in an appropriate direction. It should be appreciated that the arrow buttons 314a and 314b may enable such scrolling in a more controlled fashion than slider 312. It should be appreciated that the slider 312 and the arrow buttons 314a and 314b may not be displayed in scrolling is impossible—that is, such scrolling indicators may not be displayed if the display control is appropriately sized to display each of the data list items stored in the storage device 118.

Display control 310 includes a resizer 316 which, when selected using an appropriate input device, enables an operator to resize the display control 310.

It should be appreciated that in the process 200 described above, the host device 100 is configured to receive input provided by the operator using either the scroll indicators or the resizer.

FIGS. 3 to 9 each also illustrate a message flow diagram section 350 which includes a message flow diagram 380 indicating any messages which flow between the server 360 (i.e., the host device 100) and the client 370 (i.e., the remote client 152), illustrated as arrows indicating an originator and a destination. The message flow diagram sections 350 of FIGS. 3 to 9 also illustrate a plurality of processing decisions made by each device, illustrated as device-specific boxes. As used herein, processing decisions refer to determination and/or storage of values of variables, comparisons of variables to each other, determination of display modes (i.e., virtual or non-virtual), and display operations. It should be appreciated that unlike in the process 200 illustrated above, the disclosed client 370 is configured to trap and the disclosed server 360 is configured to handle scroll events, resize events, and add/delete data item events. Thus, for any such event, FIGS. 3 to 9 illustrate an appropriate message representing the event and the handling thereof.

Referring specifically to FIG. 3, the display control 310 includes a plurality of data list items Data_List_Item_1 318a, Data_List_Item_2 318b, Data_List_Item_3 318c, Data_List_Item_4 318d, Data_List_Item_5 318e, Data_List_Item_6 318f, Data_List_Item_7 318g, Data_List_Item_8 318h, Data_List_Item_9 318i, and Data_List_Item_10 318j. It should be appreciated that Data_List_Item_10 318j is illustrated as only partially displayed within the display control 310, but that for purposes of determining the size of the display control 310, ten (10) different data list items are displayed. The slider 312 is displayed as positioned at the top of the slider bar 313, indicating that the display control 310 is displaying at least the first data list item 318a.

It should further be appreciated that a plurality of additional data list items are not displayed in the display control 310, including Data_List_Item_11 318k, Data_List_Item_12 318l, Data_List_Item_13 318m, Data_List_Item_14 318n, and Data_List_Item_15 318o. These additional data list items may be stored on the storage device 118 of host device 100.

Referring now to the message flow diagram section 350 of FIG. 3, the message flow diagram 380 illustrates a message flow including two messages 381 and 382. The message flow diagram 380 further illustrates processing decisions 361, 362, 363, 364, 365, and 372. The message flow illustrated begins when the client 370 sends a request for data list item data 381 to the server 360. The request includes data indicating that a dimension of the currently displayed display control 310 is 10. The size of 10 indicates that 10 data list items are simultaneously displayable in the display control 310.

Upon receiving such a message, the server 360 determines that the total quantity of displayed items stored in the storage device 118 is 15 displayed items, as indicated by processing decision 361. It should be appreciated that since the display control 310 is illustrated as the first display control, the server 360 may have made such a determination as to the quantity of display items by analyzing the storage device 118. Alternatively, an appropriate variable may have already been stored within the memory of the server 360. The server next determines that the applicable threshold value for the display control is 0.4, as indicated by processing decision 362. As discussed above, this threshold value may be entered by an operator, hard-coded by a programmer, or determined in any other suitable way.

To determine whether to operate in virtual mode or in non-virtual mode, the disclosed system determines the ratio between the display control dimension and the total number of display items. Specifically, the disclosed system determines the ratio to be 0.67, as indicated by processing decision 363. The system next compares the ratio of 0.67 to the threshold value of 0.4 and determines that the ratio exceeds the threshold value, as indicated by processing decision 364. Based on this comparison, the disclosed system operates in non-virtual mode, as indicated by processing decision 365.

Because the system is operating in non-virtual mode, the system sends a response message 382 to the client 370 including each of the data list items 1-15. The client 370, utilizing the data representative of the 15 sent data list items contained in response message 382, determines the appropriate way to display data list items 1-15 within the display control 310, as indicated by processing decision 372.

Referring again to the screen shot section 300, the display control 310, despite having received each of the data list items 1-15, only displays Data_List_Item_1 318a, Data_List_Item_2 318b, Data_List_Item_3 318c, Data_List_Item_4 318d, Data_List_Item_5 318e, Data_List_Item_6 318f, Data_List_Item_7 318g, Data_List_Item_8 318h, Data_List_Item_9 318i, and Data_List_Item_10 318j (i.e., data list items 1-10). Upon determining how to appropriately display the received data list items 1-15, the disclosed system enables an operator to scroll through the displayed items utilizing the slider 312 or the arrows 314a and 314b. Since the system is operating in non-virtual mode, any determinations regarding which items to display in the display control 310 are made by the client without sending additional requests for data to the server 360.

Referring now to FIG. 4, display control 310 is illustrated in the screen shot section 300 after an operator has used the slider 312 and/or the arrows 314a and 314b to scroll downward through the displayed data list items. In the display control 310 illustrated in FIG. 4, Data_List_Item_6 318f, Data_List_Item_7 318g, Data_List_Item_8 318h, Data_List_Item_9 318i, Data_List_Item_10 318j, Data_List_Item_11 318k, Data_List_Item_12 318l, Data_List_Item_13 318m, Data_List_Item_14 318n, and Data_List_Item_15 318o are displayed by the display control 310. Moreover, the slider 312 is illustrated as positioned relatively downwardly within the slider bar 313, indicating the relative position of the displayed data list items within the entire set of data list items 1-15.

Referring to the message flow diagram section 350 of FIG. 4, the client 370 generates a scroll message 383 indicating that an operator has input a desired scroll input. The scroll message includes data indicating the position to which the operator has scrolled (not shown) and also includes data indicating that the current size of the display control is 10. Upon receiving the scroll message 383, the server determines that the total number of data list items to display remains 15, as indicated by processing decision 361, and determines that the threshold remains 0.4, as indicated by processing decision 362. Based on the received display control size of 10, the system determines that the ratio remains at a value of 0.67, as indicated by processing decision 363. It should be appreciated that the ratio remains at a value of 0.67 due to the fact that neither the total quantity of items to be displayed nor the display control size (i.e., the two components of the ratio) has changed. Because the ratio still exceeds the threshold value, as indicated by processing decision 364, the system continues displaying the plurality of data list items in non-virtual mode, as indicated by processing decision 365.

It should be appreciated that because the system continues displaying the data list items in non-virtual mode, the client 370 handles the display of the correct subset of the display items in response to the scroll input by the operator. It should be further appreciated that in various embodiments, the client 370 of the disclosed system is not configured to trap and handle a scroll event. For example, the client of the disclosed system may only send a message to the server 360 when it requires additional data from the server. If the system is operating in non-virtual mode, it should be appreciated that the client 370 may not need additional data from the server 360 for a simple scroll operation.

The screen shot section 300 of FIG. 5 illustrates the display control 310 after an operator has used the resizer 316 to resize the display control 310. Specifically, in the illustrated embodiment, an operator at the remote client 152 clicked and dragged the resize indicator 316 so as to shrink the display control in the vertical direction. Whereas in FIGS. 3 and 4 the display control 310 had a dimension of 9, the display control 310 of FIG. 5 is sized only to display Data_List_Item_9 318i, Data_List_Item_10 318j, Data_List_Item_11 318k, Data_List_Item_12 318l, Data_List_Item_13 318m, Data_List_Item_14 318n, and Data_List_Item_15 318o.

Referring to the message flow diagram 380 of the message flow diagram section 350 of FIG. 5, the client 370 sends a resize message 384 to the server 360, indicating that an operator has modified the size of the display control 310. The resize message 384 includes data indicating that the new control size (after resizing) is 7. The server 360 thus determines that the total number of items to display remains 15, as indicated by processing decision 361, and that the threshold value remains 0.4, as indicated by processing decision 362. Based on the display control size of 7 received in resize message 384, the server 360 determines that the ratio between the display control size and the total number of items to display is 0.47, as indicated by processing decision 363. Once again, the system determines that the ratio exceeds the threshold value, as indicated by processing decision 364, and determines that the system should continue operating in non-virtual mode, as indicated by processing decision 365. Therefore, the client 370 handles appropriately displaying the data list items in the display control 310 based on the data received from the server in response message 382 of the message flow diagram 380 of FIG. 3.

FIG. 6 illustrates the display control 310 in the screen section 300 after the operator has again resized the display control 310. Specifically, the operator has again used the resizer 316 to reduce the vertical size of the display control 310. In the illustrated embodiment, the display control 310 of FIG. 6 displays only five data list items including Data_List_Item_11 318k, Data_List_Item_12 318l, Data_List_Item_13 318m, Data_List_Item_14 318n, and Data_List_Item_15 318o.

The message flow diagram section 350 of FIG. 6 illustrates a message flow diagram 380 including two messages. Specifically, upon receiving a resize message 385 indicating a new display control size of 5, the server 360 again determines that 15 data list items remain for displaying in the display control 310 and that the threshold value remains at 0.4, as indicated by processing decisions 361 and 362, respectively. Based on the display control size received in the resize message 385, the server 360 calculates a ratio between the display control size and the total quantity of displayed items of 0.33, as indicated by processing decision 363. Because the ratio is less than the threshold value of 0.4, as indicated by processing decision 364, the disclosed system determines that data should be sent from the server 360 to the client 370 in virtual mode, as indicated by processing decision 365. Thus, the disclosed system sends a response message 386 including data representing data list items 11 to 15 to the client 370 for display in the display control 310, as indicated by processing decision 372.

It should be appreciated that because the system is operating in virtual mode, the display control 310 does not need to determine which of the plurality of received data list items to display; rather, it displays each of the list data items it received from the server 360 in the message 386. It should be further appreciated that upon switching from displaying the list items in non-virtual mode to displaying the list items in virtual mode, the disclosed system may delete the stored list items from the remote client 152. Alternatively, the disclosed system may continue to store previously sent list items and may treat any additional list items which are not stored as being sent based on a virtual mode of operation. In the embodiments illustrated in FIGS. 6 to 9, the system deletes or otherwise removes any data stored on the client 370 indicating data list items for display such that upon entering virtual mode, the disclosed system sends each data list item to be displayed based on the size and position of the display control 310.

FIG. 7 illustrates the display control 310 after receiving an input from the operator using either the slider 312 or the arrow buttons 314a and 314b. Specifically, the operator indicated a scroll upward input such that Data_List_Item_9 318i, Data_List_Item_10 318j, Data_List_Item_11 318k, Data_List_Item_12 318l, and Data_List_Item_13 318m are visible, as opposed to data list items 318k, 318l, 318m, 318n, and 318o as in FIG. 6. The message flow diagram section 350 of FIG. 7 illustrates a message flow chart 380 corresponding to the scroll illustrated in the display control section 300. Specifically, upon receiving a scroll message 387 from the client 370, the disclosed system determines that the total number of displayed items remains at 15, as indicated by processing decision 361, that the threshold value remains 0.4, as indicated by processing decision 362, that the ratio remains 0.33, as indicated by processing decision 363, and that because the ratio remains less than the threshold value, the system continues to operate in virtual mode, as indicated by processing decisions 364 and 365. The server 360 responds to the scroll message by sending an appropriate response message 388 which includes data list items 9 and 10. It should be appreciated that because the system is operating in virtual mode, the server 360 determines that the client 370 did not receive items 9 and 10 in its most recently received message, and thus sends the missing items. The client 370 then displays the appropriate list items 9-13, as indicated by processing decision 372.

FIG. 8 illustrates the display control 310 in the screen shot section 300 after the operator has deleted all but 3 of the data list items 1-15 from the display control 310. Specifically, all of the data list items, with the exception of Data_List_Item_3 318c, Data_List_Item_4 318d, and Data_List_Item_5 318e have been removed from the display control 310. It should be appreciated that the deleted data list items may be removed in any appropriate way, such as by selecting and deleting using a keyboard or mouse-type input device. In the illustrated embodiment, the operator did not resize the display control 310, resulting in empty space 319 within the display control. Because the displayed data list items 318c, 318d, and 318e are entirely displayable within the display control 310, the display control 310 does not include a slider 312 in the slider bar 313, and the arrows 314a and 314b are indicated as being non-selectable.

The message flow diagram section 350 of FIG. 8 illustrates a message flow diagram 380 beginning with the client 370 sending a delete data list items message 389. The delete data list items message 389 includes data indicating that list items 1, 2, and 6-15 are to be deleted. The message 389 further includes data indicating a control size of 5 for display control 310. It should be appreciated that the control size exceeding the quantity of data list items results in the empty space 319 of the display control. In response to the delete data items message, the server 360 does not delete the appropriate items from the storage device 118. Rather, the server just causes the items displayed in the display control 310 to reflect the deletion. It should be appreciated that in alternative embodiments, the server may delete the items from the storage device 118 upon receiving such a delete data items message 389.

Based on the received message, the server determines that the total number of display items remaining (after deletion) is 3 items, as indicated by processing decision 361. The server 360 determines that the threshold value remains 0.4, as indicated by processing decision 362. The server 360 calculates a new ratio of 1.33, indicated by processing decision 363, which represents the ratio of the display control size (5) to the total number of items to be displayed (3). Because the ratio exceeds the threshold value, as indicated by processing decision 364, the server determines that the display mode should be non-virtual, as indicated by processing decision 365. The server therefore sends a message 390 to the client 370 including data representing each of the remaining data list items— that is, data list items 3-5. The client 370 displays the list items 318c, 318d, and 318e in the display control, as indicated by processing decision 372. It should be appreciated that the client 370 displays the items in non-virtual mode—that is, the client 370 handles determining which (if any) subset of the data list items to display. It should thus be appreciated that FIG. 8 illustrates an impact on the ratio caused by deletion of data list items from the total set of data list items.

It should be further appreciated that sending a message from the client 370 to the server 360 which adds data list items to the overall set of data list items may have a similar impact. Specifically, if the reverse operation performed in FIG. 8 is performed (i.e., 12 data items are added to the set of data list items), the disclosed system would calculate a ratio of 5/15 or 0.33, which would be less than the threshold value of 0.4. As a result, the system would determine it should operate in non-virtual mode, and would send only the data items which could be simultaneously displayed in the display control with a size of 5.

The disclosed system may be used in conjunction with software which facilitates thin client implementations of the remote client 152. For example, the disclosed system may be used in conjunction with software which sends only display data to a remote client 152. The remote client 152 may not perform any processing; it may merely act as a remote monitor or terminal for displaying output and receiving input generated by the host device 100.

The disclosed host device 100 may also enable the remote client 152 to act as a thick client. That is, the disclosed host device 100 may enable the remote client to send commands directly to the storage device 118 and may rely on the remote client to perform most of the logic required to display the disclosed menu control. For example, the remote client 152 may include software configured to determine whether the remote client 152 is operating in virtual or non-virtual mode, to determine which data items are required for display, and to generate appropriate request messages for sending to the host device 100.

Regardless of whether the host system 100 enables an operator at a remote client 152 acting as a thin client or a thick client to interact with the host system 100 via a network 140, the disclosed system enables an operator to remotely view a plurality of data list items using a display control which seamlessly determines whether to operate in virtual or non-virtual mode. Moreover, this determination may be made a plurality of times during the operator's browsing, navigation, and modification of the list items while remaining invisible to the operator. It should thus be appreciated that the disclosed system enables efficient use of network resources wherein the efficiency is determined based on the capabilities of a remote display control.

In summary, a system and methods for providing access to a plurality of list items including determining whether to display the list items in virtual mode by sending only the currently displayed items or in non-virtual mode by sending the full set of list items have been provided. It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of displaying a plurality of items at a remote location, the method comprising:
   storing a display control dimension which is indicative of a quantity of items which are simultaneously displayable at the remote location;
   storing a threshold value which is indicative of a quantity of items which is greater than the quantity of items which are simultaneously displayable at the remote location;
   storing the plurality of items;
   determining a quantity associated with the plurality of items;
   receiving a request for data representing the plurality of items from the remote location;
   determining a relationship value indicative of a relationship between the display control dimension and the quantity associated with the plurality of items;
   comparing the relationship value to the threshold value;
   conditioned on the relationship value exceeding the threshold value, sending the data representing the plurality of items to the remote location for display; and
   conditioned on the relationship value not exceeding the threshold value, sending a subset of the data representing the plurality of items to the remote location for display.

2. The method of claim 1, wherein the relationship value is a first relationship value, the method further comprising:
   receiving data indicating a desired change in the quantity associated with the plurality of items and determining a second relationship value indicative of the relationship between the display control dimension and the changed quantity.

3. The method of claim 2, wherein the data indicating a desired change in the quantity associated with the plurality of items includes data indicating an addition or a deletion of at least one item.

4. The method of claim 1, wherein the threshold value is based, at least in part, on a set of hardware specifications of a machine at the remote location.

5. The method of claim 4, wherein the set of hardware specifications includes at least one selected from the group consisting of: a processor speed of the machine, a monitor size of the machine, and an amount of memory of the machine.

6. The method of claim 1, wherein the threshold value is based, at least in part, on a network connection speed of a network.

7. The method of claim 1, wherein determining the relationship value includes calculating a ratio between the display control dimension and the quantity associated with the plurality of items.

8. The method of claim 1, wherein the display control dimension reflects a quantity of items simultaneously displayable by the display control.

9. The method of claim 1, wherein the display control dimension reflects a quantity of pixels of a height of the display control.

10. The method of claim 1, wherein the quantity associated with the plurality of items indicates a number of the plurality of items.

11. The method of claim 1, wherein the quantity associated with the plurality of items indicates a storage size of the plurality of items in bytes.

12. The method of claim 1, wherein the subset of the data is a first subset, the method further comprising:
   conditioned on the relationship value not exceeding the threshold, sending a second, different subset of the data upon receiving data indicating a scroll input.

13. The method of claim 1, wherein at least one of the items is associated with content data, the method further comprising:
   conditioned on the relationship value exceeding the threshold value, sending the data representative of the plurality of items and the associated content data to the remote location.

14. The method of claim 1, wherein at least one of the items is associated with content data, the method further comprising:
conditioned on the relationship value not exceeding the threshold value, sending the subset of the data representing the plurality of items and the content data associated with the items represented by the subset of the data to the remote location.

15. The method of claim 1, the method further comprising: receiving the display control dimension from the remote location.

16. The method of claim 1, wherein the request for data representing the plurality of items includes information about a display control, the information about the display control including information representative of the display control dimension.

17. The method of claim 1, wherein the threshold value is entered by an operator of a device at the remote location.

18. The method of claim 1, wherein the threshold value is entered by an operator of the server.

19. A method of sending data for display at a destination, the method comprising:
receiving a display control size which is indicative of a quantity of items which are simultaneously displayable at the destination;
receiving from the destination a request for the data;
determining a quantity indicative of the size of the data;
determining a comparison ratio between the quantity indicative of the size of the data and the display control size;
comparing the comparison ratio to a threshold ratio which is indicative of a quantity of items which is greater than the quantity of items which are simultaneously displayable at the destination;
conditioned on the comparison ratio being in a first quantifiable relationship with the threshold ratio, sending a subset of the data to the destination for display; and
conditioned on the comparison ratio being in a second quantifiable relationship with the threshold ratio, sending the data to the destination for display.

20. A system for sending data for display at a destination, the system comprising:
at least one processor; and
at least one memory device which stores a plurality of instructions which, when executed by the at least one processor, cause the at least one processor to operate with the at least one memory device to:
receive a display control size which is indicative of a quantity of items which are simultaneously displayable at the destination;
receive from the destination a request for the data;
determine a quantity indicative of the size of the data;
determine a comparison ratio between the quantity indicative of the size of the data and the display control size;
compare the comparison ratio to a threshold ratio which is indicative of a quantity of items which is greater than the quantity of items which are simultaneously displayable at the destination;
conditioned on the comparison ratio being in a first quantifiable relationship with the threshold ratio, send a subset of the data to the destination for display; and
conditioned on the comparison ratio being in a second quantifiable relationship with the threshold ratio, send the data to the destination for display.

\* \* \* \* \*